United States Patent [19]

Ohta et al.

[11] Patent Number: 4,838,914
[45] Date of Patent: Jun. 13, 1989

[54] PROCESS FOR PRODUCING SILICA GLASS FIBERS

[75] Inventors: Hironori Ohta, Yokohama; Toshiyasu Kawaguchi, Atsugi; Takashi Mukaiyama; Katsuhiko Matsuzaki, both of Yokohama; Junichi Ebisawa, Tokyo; Naoki Taneda, Yokohama; Daikichi Arai, Yokohama; Noriyuki Yoshihara, Yokohama; Yoshikazu Yamada, Yokohama; Koushiro Kunii, Iwaki, all of Japan

[73] Assignee: Asahi Glass Company Ltd., Tokyo, Japan

[21] Appl. No.: 133,435

[22] Filed: Dec. 15, 1987

[30] Foreign Application Priority Data

| Jul. 3, 1987 | [JP] | Japan | 62-165396 |
| Oct. 16, 1987 | [JP] | Japan | 62-259630 |
| Oct. 16, 1987 | [JP] | Japan | 62-259631 |
| Dec. 8, 1987 | [JP] | Japan | 62-308585 |

[51] Int. Cl.$^4$ .................................... C03B 37/016
[52] U.S. Cl. .............................. 65/2; 65/17; 65/18.3; 65/18.4; 65/DIG. 901; 264/63; 264/DIG. 19; 264/901; 501/12
[58] Field of Search ............... 65/2, 17, 18.3, 18.4, 65/DIG. 901; 501/12; 264/63, DIG. 19

[56] References Cited

U.S. PATENT DOCUMENTS

| 3,514,841 | 6/1970 | Woodward et al. | 65/1 X |
| 3,821,070 | 6/1974 | Mansmann et al. | 65/901 X |
| 3,846,527 | 11/1974 | Winter et al. | 264/63 |
| 3,907,954 | 9/1975 | Mansmann et al. | 264/63 |
| 4,399,232 | 8/1983 | Yajima et al. | 501/38 |
| 4,649,003 | 3/1987 | Hashimoto et al. | 264/63 |

*Primary Examiner*—Robert L. Lindsay
*Attorney, Agent, or Firm*—Oblon, Fisher, Spivak, McClelland & Maier

[57] ABSTRACT

A process for producing silica glass fibers comprising:
a step of preparing a silica glass fiber spinning solution by adding a polymerization regulator to a silica sol solution obtained by the hydrolysis and condensation of a silicon alkoxide in the presence of an acid catalyst;
a step of spinning the spinning solution into gel fibers by extruding the spinning solution from nozzles;
a step of applying an oiling agent containing substantially no water or lower alcohol to the gel fibers;
a step of forming a fiber cake by winding the oiled gel fibers on a tube or bobbin;
a step of aging the gel fibers constituting the fiber cake;
a step of sintering the gel fibers unwound from the fiber cake after the aging step, to form silica glass fibers.

10 Claims, 2 Drawing Sheets

PROCESS FOR PRODUCING SILICA GLASS FIBERS

The present invention relates to process for producing silica glass fibers. More particularly, it relates to a process for producing silica glass fibers by a sol-gel method.

Heretofore, it has been well-known to obtain inorganic fibers by spinning a material obtained by the hydrolysis and condensation of a metal alkoxide into gel fibers and then sintering the gel fibers. Such inorganic fibers include various kinds such as $SiO_2$ (Kamiya, Sakka et al., Yokyo-shi 86, 552–559, 1978), $SiO_2$-$ZrO_2$ (Japanese Unexamined Patent Publication No. 77724/1979), $SiO_2$-$TiO_2$ (Japanese Unexamined Patent Publication No. 77723/1979), $Al_2O_3$ (Japanese Unexamined Patent Publication No. 12736/1976) and $Al_2O_3$-$SiO_2$ (Japanese Unexamined Patent Publication No. 13768/1976).

A spinning solution composed essentially of a silica sol to be used for the preparation of slica fibers ($SiO_2$ fibers) among them, can suitably be prepared by hydrolyzing and condensing a silicon alkoxide such as tetramethoxysilane (TMS) or tetraethoxysilane (TES) in an alcohol in the presence of an acid catalyst such as hydrochloric acid and concentrating the product to a suitable concentration.

When left at room temperature, the silica sol is likely to undergo hydrolysis and polymerization, and the viscosity gradually increases as the polymerization proceeds. It is necessary to bring the silica sol concentration to a level of from 35 to 50% by weight as $SiO_2$ in order to impart spinnability to the spinning solution. However, at such a concentration, it is difficult to conduct spinning without breakage for a long period of time because of an increase of the viscosity and a rapid increase in the gelling rate, and it will be difficult to maintain the diameter of silica glass fibers at a constant level or to produce fine silica glass fibers.

Further, when a conventional spinning solution is used, the drying efficiency is poor, and it is required to increase the temperature of the chimney used for the spinning apparatus or to increase the distance between the spinning nozzles and the winding machine. There is a further drawback such that blackening is likely to result due to carbonization when the gel fibers obtained by spinning are sintered to obtain silica glass fibers.

In the process for the production of silica glass fibers by a sol-gel method, a spinning solution is extruded by a dry spinning method to form fibers in a gel state (hereinafter referred to simply as gel fibers) which are a precursor of silica glass fibers. Usually, the spinning solution is extruded from a plurality of nozzles, and a plurality of gel fibers thus formed are gathered while being stretched to form a strand.

It frequently happens that the extruded spinning solution deposits on the base plate around the nozzle holes. This phenomenon is particularly remarkable when the nozzle holes are formed through the base plate having no protrusion. Once this phenomenon occurs, the spinning solution extruded from the nozzle holes spreads on the base plate, whereby gel fibers tend to be hardly formed or, if formed, they tend to undergo breakage during the spinning operation. Therefore, when this phenomenon occurs, it will be necessary to clean the peripheral portions of the nozzle holes, which brings about a loss in time.

Further if the diameter of the nozzle holes is not properly selected, the diameter of the spinned gel fibers may not be sufficiently small, thus failing to obtain a desired diameter, or there may be troubles such as breakage of fibers or clogging of the nozzles.

For handling a strand of fibers continuously spinned, various methods are known depending upon the physical properties of the fibers, the means for conveying the strand to the next step and the balance in the production line. For example, the strand may be wound up by a winding machine (winding method), or the strand may be piled or deposited on a moving mesh belt or on a coiler can (piler method).

In either the winding method or the piling method, contact of the strand with itself or application of an external force to the stand can not be avoided, whereby adhesion of fibers, breakage of fibers, fuzzing or a disorder in the gathering of fibers is likely to occur. This will reduce the quality of the strand or will lead to a trouble during the operation, a reduction in the yield or a deterioration in the quality of silica glass fibers as a final product.

The above problems are similar to troubles in the stabilization or thermal stabilization treatment of a precursor for the preparation of carbon fibers (such as adhesion of monofilaments, fuzzing or breakage of fibers resulting from the mechanical defects on the fiber surface). In order to solve such troubles, oiling agents for the precursor for the preparation of carbon fibers are disclosed in Japanese Examined Patent Publications No. 10175/1978 and No. 43446/1985. However, such oiling agents for the precursor for the preparation of carbon fibers are emulsion type agents, and can not be applied to gel fibers prepared by a sol-gel method, since water adversely affects the chemical reaction of the gel fibers to deteriorate the strength of the gel fibers.

In the process for the preparation of silica glass fibers by a sol-gel method, gel fibers are formed usually through a drying chimney, but the gel fibers immediately after the formation have poor strength.

The gel fibers contain an organic component, and to obtain silica glass fibers, the gel fibers are subjected to sintering. In this sintering step, the organic component is likely to be carbonized in the interior of the gel fibers, whereby black-stained silica glass fibers are likely to result from the sintering. If the temperature-raising rate for heating is lowered in order to avoid the carbonization, the productivity will be poor.

Further, since the gel fibers immediately after the formation have poor strength, they are likely to break during the sintering step.

Under the circumstances, it is an object of the present invention to overcome the above-mentioned various problems involved in the conventional technique and to provide a satisfactory process for the production of slica fibers.

The present invention provides a process for producing silica glass fibers comprising:

a step of preparing a silica glass fiber spinning solution by adding a polymerization regulator to a silica sol solution obtained by the hydrolysis and condensation of a silicon alkoxide in the presence of an acid catalyst;

a step of spinning the spinning solution into gel fibers by extruding the spinning solution from nozzles;

a step of applying an oiling agent containing substantially no water or lower alcohol to the gel fibers;

a step of forming a fiber cake by winding the oiled gel fibers on a tube or bobbin;

a step of aging the gel fibers constituting the fiber cake;

a step of sintering the gel fibers unwound from the fiber cake after the aging step, to form silica glass fibers.

Now, the present invention will be described in detail with reference to the preferred embodiments.

Now, the process of the present invention will be described in detail.

(1) STEP OF PREPARING A SILICA GLASS FIBER SPINNING SOLUTION

The present invention provides a step of preparing a silica glass fiber spinning solution wherein the silica glass fiber spinning solution is prepared by adding a polymerization regulator to the above-mentioned silica sol solution. The polymerization regulator may preferably be a silicon compound represented by the formula $Y_1(Y_2)(Y_3)SiX$ wherein each of $Y_1$, $Y_2$ and $Y_3$ is an allyl group, an aryl group, a phenyl group, a vinyl group or an alkyl group and X is H, Cl, Br, I, OH or OR wherein R is an alkyl group having from 1 to 10 carbon atoms.

The silica sol solution to be used in the present invention is prepared by hydrolyzing and condensing a silicon alkoxide such as TMS or TES in a lower alcohol such as methyl alcohol or ethyl alcohol in the presence of an acid catalyst such as nitric acid or hydrochloric acid in accordance with a usual method and concentrating the product to a suitable concentration.

To the silica sol solution thus obtained, the silicon compound having the formula $Y_1(Y_2)Y_3SiX$ (hereinafter simply referred to as the specific silicon compound) having three organic functional groups $Y_1$, $Y_2$ and $Y_3$ and one hydrolyzable group X is added.

Each of $Y_1$, $Y_2$ and $Y_3$ may be an alkyl group such as $CH_3$—, $C_2H_5$—, $C_3H_7$— or $C_8H_{17}$—, an allyl group such as $C_2H_4$— or aryl group such as Further, it may be such a group wherien H is substituted by a functional group such as $CH_3$ or Namely, the alkyl group, the allyl group and the aryl group of the present invention include such derivatives.

$Y_1$, $Y_2$ and $Y_3$ may be different from one another, or two or three of them may be the same. Each of $Y_1$, $Y_2$ and $Y_3$ is preferably an alkyl group, particulary an alkyl group having from 1 to 4 carbon atoms, or a phenyl group, whereby particularly good results can be obtained. The carbon number of $Y_1$, $Y_2$ and $Y_3$ is preferably not higher than 20. The alkyl group or the allyl group may have a side chain, or may be cyclic compound. Further, a vinyl group may be employed.

X may be H, Cl, Br, I, OH or OR wherein R is an alkyl group having from 1 to 10 carbon atoms. R may have a side chain. Specifically, R includes $CH_3$—, $C_2H_5$—, $C_3H_7$—, $C_4H_9$— and $C_8H_{17}$—, and particularly prefered is an alkyl group having from 1 to 6 carbon atoms.

The specific silicon compound is added to the silica sol. As a method for the addition, it is possible to employ a method wherein the silicon alkoxide is hydrolyzed and condensed, and when the product has reached the desired viscosity (polymerization degree), a specific silicon compound solution (concentration: 40–90% by weight) dissolved in a solvent such as acetone, toluene, hexane, ethyl alcohol or methyl alcohol is added or a method wherein the specific silicon compound is directly added and stirred.

The specific silicon compound is added preferably in such an amount that the molar ratio of Si contained in the specific silicon compound to Si contained in the silica sol will be within a range of from 0.01 to 2.5, more preferably from 0.05 to 0.8. If the amount of the specific silicon compound is too small, no adequate effect will be obtained. On the other hand, if the amount is excessive, the gelatin after spinning tends to be difficult and there will be additional problems which will be described hereinafter.

By the addition of the specific silicon compound, the polymerization rate of the silica sol will decrease, and the rate of increase of the viscosity and the gelling rate tend to be small. Thus, the spinning operation can readily be conducted under a stabilized condition, and the irregularity in the diameter of the resulting fibers will be small. However, it takes a longer time to obtain an adequate polymerization degree required for the spinnability. Further, the larger the amount of the specific silicon compound, the longer the potlife. Therefore, the amount of the specific silicon compound may be determined to obtain a desired potlife. Further, the polymerization degree of the silica sol to which the specific silicon compound is added, may be determined taking into consideration the storage period of the silica sol and the amount of the specific silicon compound to be added. There is no particular restriction as to the spinning method, and any conventional spinning method may be employed.

The specific silicon compound has one hydrolyzable group and three organic functional groups. Therefore, the specific silicon compound will react with the terminals of the silicon polymer constituting the silica sol, whereby the terminals will be sealed with Si having three organic functional groups and thus lose the reactivity. Since the molar ratio of Si contained in the specific silicon compound to the Si contained in the silica sol is within a range of from 0.01 to 2.5, preferably from 0.05 to 0.8, the terminals of the silicon polymer will be sealed only partially. Therefore, the reactivity of the silica sol will be controlled, but the gelling properties after spinning are not lost.

According to the present invention, the stability of the spinning solution increases, whereby the diameter of the resulting fibers can be made fine and uniform without irregularities. Further, the resulting fibers will have improved strength and will be free from coloring due to carbonization during the sintering step.

In the present invention, the silica glass fiber spinning solution thus prepared has from 42 to 48% by weight of residual $SiO_2$ when heated to 1,000° C., a water content of not higher than 2% by weight and a viscosity of from 50 to 100 poise at 25° C.

It is generally believed that when a polymer of a metal alkoxide dispersed in a solvent is extruded for dry spinning as in the present invention to obtain gel fibers, rapid evaporation of the solvent and consequential three dimensional crosslinking of the polymer (change from the sol to a gel) take place. Therefore, in order to spin continuous fibers under a stabilized condition without breakage, an attention must be paid to the evaporation rate of the solvent, the content of the polymer (polysiloxane in the present invention) in the sol solution and the polymerization state. In the present invention, these points have been studied, and as a result, it has been found that a number of fibers (more than 100 fibers) can continuously be spun without breakage. The composition and the nature of the spinning solution will be described.

According to the present invention, the content of the polysiloxane in the spinning solution is from 42 to 48% as represented by the weight of the residue ($SiO_2$) when the spinning solution was heated at 1,000° C. If the content is less than 42%, gelatin after the extrusion tends to be inadequate, and breakage of the fibers tends to increase. On the other hand, if the content exceeds 48%, gelation after the extrusion proceeds rapidly, which causes breakage of the fibers or which tends to lead to clogging of some of the nozzles. The spinning solution may be adjusted to have a polysiloxane content within the above-mentioned range by adjusting the amount of an alcohol solvent to be added for the hydrolysis of TES and its polymer, or by removing or adding the alcohol solvent during the polymerization reaction step. As such an alcohol solvent, it is usual to employ ethanol and/or methanol.

The polymerization state of the polysiloxane is also a very important factor for the spinnability. It has been found preferable that TES is hydrolyzed by using an acid catalyst so that the remaining water content in the spinning solution will be not higher than 2% by weight, more preferably not higher than 1% by weight. As the acid catalyst, hydrochloric acid or nitric acid is preferred. The concentration of the acid catalyst is from 0.1 to 3.5% by weight relative to TES.

When the above conditions are all satisfied and the polymerization has proceeded so that the viscosity is within a range of from 50 to 100 poise at 25° C., it is possible to spin a number of gel fibers, particularly more than 100 gel fibers, by the extrusion dry spinning method continuously and simultaneously without breakage.

It used to be difficult to produce long silica glass fibers by continuous spinning of gel fibers if the number of fibers is increased. It has now been made possible by the present invention to produce a practically useful strand of long silica glass fibers on an industrial scale.

According to the present invention, it is possible to produce silica glass fibers having a small diameter (major diameter of not larger than 12 μm which corresponds to a diameter of about 9 μm of a circle having the same cross sectional area) and a strand of such silica glass fibers.

Further, according to the present invention, it is possible to produce silica glass fibers having high strength (60–100 kg/mm$^2$). As conventional values, about 32 kg/mm$^2$ is known with a diameter of circular cross section of from 5 to 10 μm (U.S. Pat. No. 3,821,017) and from 30 to 65 kg/mm$^2$ is known with a diameter of circular cross section of from 20 to 40 μm (J. Mater. Sci. 21 842–848, 1986).

Furthermore, the silica glass fibers prepared by sintering the gel fibers according to the present invention contains a least amount of the remaining organic substance. Thus, according to the present invention, it is possible to obtain silica glass fibers having a high purity ($SiO_2 > 99.99\%$).

(2) SPINNING STEP

Figure 1:
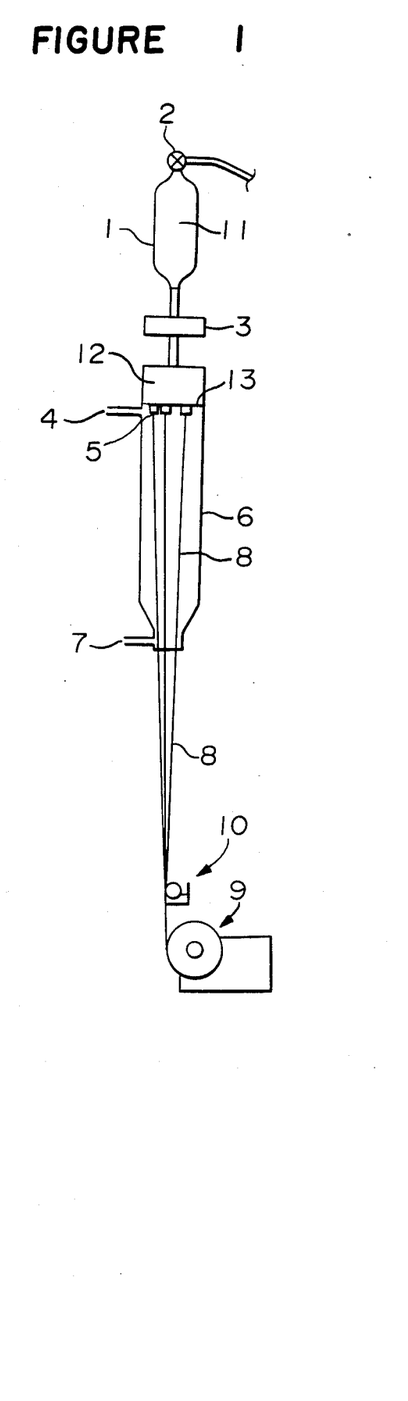
FIG. 1 illustrates an apparatus for the spinning step, the oiling step and a fiber cake-forming step.

FIG. 1 shows a spinning apparatus, wherein reference numeral 1 indicates a spinning solution tank, numeral 2 indicates a valve for pressurizing gas, numeral 3 indicates a filter, numeral 4 indicates an air inlet, numeral 5 indicates a nozzle, numeral 6 indicates chimney, numeral 7 indicates an air outlet, numeral 8 indicates a gel fiber, numeral 9 indicates a winding machine, numeral 10 indicates an oiling agent applicator, numeral 11 indicates a spinning solution, numeral 12 indicates a nozzle chamber and numeral 13 indicates a base plate.

As shown in FIG. 1, the silica glass fiber spinning solution 11 is led to the spinning nozzle holes 5 provided on the base plate 13 constituting the bottom plate of the nozzle chamber 12. The spinning solution is extruded from the nozzle holes 5 to form gel fibers 8.

Figure 2:
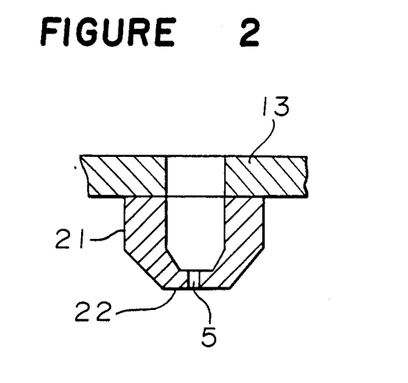
FIG. 2 illustrates a spinning nozzle.

The present invention provides a spinning step which is characterized in that the nozzles have nozzle holes 5 which are formed perpendicularly to end surfaces 22 of protrusions 21 formed on the base plate 13, said end surfaces 22 being in parallel with said base plate 13, and which extend through the base plate 13, and the diameter of the nozzle holes is within a range of not larger than 14 times the diameter of the gel fibers or at least 0.03 mm.

The extrusion of the spinning solution is conducted by a pressurizing means such as a pressurizing gas or by a quantitative pump such as a gear pump.

The base plate for the spinning nozzles forms a hollow box together with a hollow upper structure watertightly connected to the base plate. The box has a hole through which the spinning solution is introduced. Namely, the spinning solution introduced into the hollow portion thus formed (hereinafter referred to as a spinning solution chamber) is extruded by a suitable pressurizing means from the nozzles provided on the base plate and spun to form gel fibers as precursors for silica glass fibers.

The cross sectional shape of gel fibers may be an oval shape, a shape of oval with its central portion constricted or a bend shape of "<". The diameter of a circle having a surface area equal to such a non-circular cross section is used as the diameter of the fibers for the sake of convenience.

The size of nozzle holes 5 is restricted by the diameter of gel fibers to be spun. The maximum stretching ratio for the spinning of gel fibers as precursors for the silica glass fibers by the sol-gel method is usually at a level of from 12 to 14, when the ratio of the diameter of nozzles to the diameter of the gel fibers most finely spinnable continuously and constantly is referred to as the maximum stretching ratio. Accordingly, in order to obtain fine gel fibers having a diameter of not more than 10 μm to improve the processability by increasing the flexibility of the strand or to improve the physical properties when combined with a resin, without leading to a trouble such as breakage during the spinning, the diameter of nozzle holes is preferably not larger than 0.14 mm, more preferably not larger than 0.12 mm. On the other hand, if the nozzle hole diameter is too small, clogging of nozzles is likely to be led due to foreign matters entered during the assembling or due to a gel formed from the spinning solution. Thus, the lower limit of the diameter of the nozzle holes is preferably at least 0.03 mm, more preferably at least 0.05 mm.

The number of nozzle holes should preferably be one hole in each protrusion, but a plurality of holes may be provided in each protrusion, unless the object of the present invention is thereby impaired.

When each protrusion has only one nozzle hole, even if the deposition of the extruded spinning solution occurs around the nozzle hole, it is possible to prevent the spreading of the deposited spinning solution to the adjacent nozzle holes, and the cleaning of the deposited spinning solution can relatively easily be conducted.

The spinning nozzles may be disposed over the entire surface of the effective portion of the base plate, or over the entire surface but a portion thereof. For example, the nozzles may be provided on a circular base plate except for the center portion thereof. The nozzles are provided preferably at a high density in order to make the apparatus compact. However, if the nozzles are provided at an excessively high density, the concentration, in the ambient air, of the solvent evaporated from the spinning solution extruded increases, whereby solidification of fibers, tends to be delayed and breakage of fibers is likely to increase, such being undesirable. It is preferred that the nozzles are provided on the base plate at a density within a range of from 0.3 to 3 nozzles/cm$^2$, preferably from 0.5 to 2.5 nozzles/cm$^2$, more preferably from 0.8 to 2.2 nozzles/cm$^2$ except for the portion of the base plate where no nozzles are provided as mentioned above. The gel fibers 8 formed by the extrusion from nozzles 5 are transported via a chimney 6 to the next oiling step.

(3) STEP FOR APPLYING AN OILING AGENT (OILING STEP)

The present invention provides an oiling step wherein the oiling agent containing no substantial water or lower alcohol to be applied to the gel fibers obtained by spinning or to a strand of such gel fibers, is a water insoluble substance.

Further, the present invention provides an oiling step wherein the water insoluble substance may be a solid paraffin having an average carbon number of from 20 to 50, or a mixture of such a solid paraffin with a liquid paraffin having an average carbon number of at least 18.

In a conventional process for the production of inorganic fibers, the oiling agent is selected primarily from the gathering performance and lubricating properties. Whereas, in the process for the production of inorganic fibers based on the sol-gel method of the present invention, the following additional requirements must be satisfied by the oiling agent, since the gel fibers are porous fibers having high reactivity. Namely, it should not substantially contain water or a lower alcohol which may cause a deterioration of the strength; it should not restrict the movement of fibers since the gel fibers undergo expansion or shrinkage after spinning; it should not diffuse into fine pores in the gel fibers to avoid rupture of the gel skelton; it should be completely removable by the sintering step after spinning; and particularly, since an alkoxy group derived from the starting substance in the gel fibers, it must be a material which does not hinder the oxidation of the alkoxy group.

The gel fibers may be wound up (hereinafter referred to as a winding method), or the gel fibers may be piled in a container (hereinafter referred to as piling method). The oiling agent of the present invention can be applied to both methods.

The present invention has been made to solve the above-mentioned problems, and the oiling agent is selected from substances which contain no substantial water or lower alcohol. Water is likely to react with the silica gel. The lower alcohol may be a solvent in the sol-gel method of the present invention, thus it has affinity to gel fibers, such being undesirable.

The oiling agent of the present invention includes fluorine oil, silicone oil and saturated hydrocarbons (paraffins). However, the present invention is not restricted to these specific oiling agents. The viscosity or gathering efficiency of the oiling agent is required to be adjusted depending upon various conditions for the preparation of gel fibers, such as the number of fibers to be gathered for a strand and the winding method. Therefore, the oiling agent is suitably selected depending upon the particular purpose among substances having various molecular weights for polymerization degrees. Further, different substances may be used in combination.

Particularly preferred is an oiling agent prepared by mixing a liquid paraffin having an average carbon number of at least 18 and a solid paraffin having an average carbon number of from 20 to 50.

The main component of the oiling agent in the present invention is a substance containing no substantial water or lower alcohol such as a liquid paraffin and/or a solid paraffin. Thus, the oiling agent of the present invention has excellent properties as an oiling agent for precursor fibers for the preparation of inorganic fibers, particularly as an oiling agent for processing inorganic fibers based on a sol-gel method, and its exhibits remarkable effects to prevent troubles caused by the above-mentioned water or alcohol type oiling agent.

If the liquid paraffin as a component of the oiling agent of the present invention has an average carbon number of less than 18, a volatile liquid (paraffins having small molecular weights) is included in the liquid paraffin, and it causes adhesion between gel fibers, whereby such a liquid paraffin is not suitable for use as an oiling agent.

Further, if the solid paraffin as a component of the oiling agent of the present invention has an average carbon number of less than 20, it hardly solidifies at room temperature, whereby the gathering efficiency of gel fibers tends to be poor, and fuzzing is likely to occur and unwinding of a strand of gel fibers tends to be difficult. On the other hand, if the average carbon number exceeds 50, unless the amount of the oiling agent applied onto the gel fibers is reduced, it causes heat generation during the sintering step, whereby it is difficult to avoid a deterioration of the strength of the fibers, and such a solid paraffin is not suitable for use as an oiling agent.

The mixing ratio A/B of the liquid paraffin A to the solid paraffin B in the present invention is from 0/100 to 100/0. The mixing ratio slightly differs as between the case where the spinning step takes a winding method and the case where the spinning step takes a piling method. In the case of a winding method, the mixing ratio of 100/0 is not suitable from the viewpoint of the gathering efficiency, fuzzing and unwinding efficiency.

The amount of the liquid paraffin and/or the solid paraffin of the present invention applied to the gel fibers is preferably from 3 to 30% (gel fibers+applied amount=100%). If the amount is less than 3%, the desired properties are hardly obtainable. On the other hand, if the amount exceeds 30%, unwinding of the fibers tends to be difficult and inflaming is likely to occur during the sintering step, whereby not only the sintering step will be troublesome, but also the strength of fibers deteriorates.

The oiling agent for gel fibers for the preparation of inorganic fibers of the present invention is a non-aqueous and non-alcohol type. Such an oiling agent is excellent in the solution stability and in the uniformity in its application to gel fibers and serves to improve the gathering efficiency of monofilaments. It also has lubricating properties and thus facilitates the unwinding of the fibers from a fiber cake while preventing the breakage or fuzzing of fibers. Further, it is effective for preventing adhesion of monofilaments before and after the sintering. Furthermore, it prevents adsorption of moisture on the fiber surface and thus prevents the gelling reaction due to moisture. The liquid paraffin of the present invention has excellent lubricating properties, and the solid paraffin further provides excellent gathering efficiency. The liquid paraffin and the solid paraffin are insoluble in each other and therefore independently function to protect gel fibers respectively.

As a method of using the oiling agent of the present invention, when the liquid paraffin or the solid paraffin is to be used alone, it is directly applied to gel fibers in a liquid state. When the liquid paraffin and the solid paraffin are to be used as a mixture, the solid paraffin is melted under heating and mixed with the liquid paraffin under stirring before application. The application of the oiling agent to gel fibers or to the strand thereof is conducted after the withdrawal from the chimney and before being wound up on the tube or bobbin. The oiling agent of the present invention may be gel fibers by a usual method in the same manner as in the case where a gathering agent is applied to fibers, such as a spray method, a roller method, a shoe method, a belt roller method or a dipping method. In FIG. 1, an oiling agent applicator 10 for a roller method is shown.

(4) STEP OF FORMING A FIBER CAKE

Figure 3A:
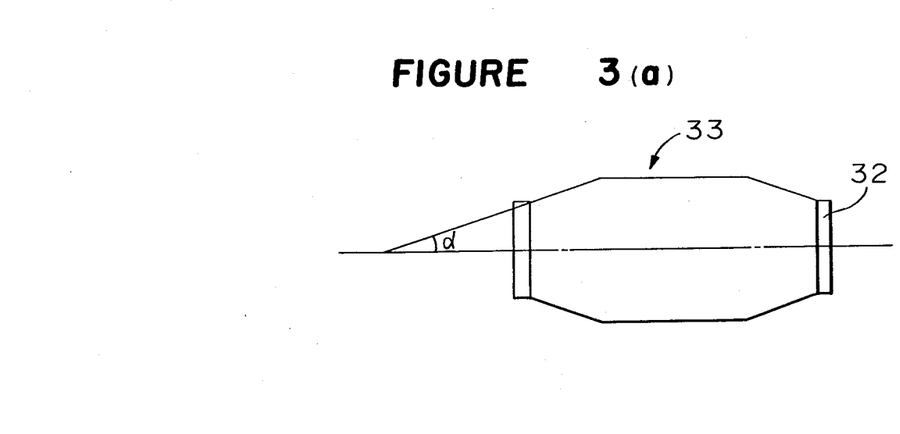
FIG. 3 illustrates a fiber cake.

In the present invention, the gel fibers are, after the application of the above-mentioned oiling agent, gathered into a strand, which is then wound up on a tube made of paper or plastic as shown at 32 in FIG. 3(a).

The wound product of the strand is called a forming package or cake (hereinafter referred to as a cake).

A piling method as mentioned above may be used as a means for continuously supplying gel fibers having relatively low strength to the sintering step. However, the gel fibers of silica are likely to react with moisture in air, whereby gelation further proceeds, and shrinkage increases as time passes. If a strand of such shrinking fibers is left in a free state as piled, loops may be formed in the fibers due to the difference in the shrinkage of the respective fibers. Thus, not only during the sintering step, but also after the sintering, the strand will have poor alignment of fibers.

Therefore, in the present invention, a winding method is employed.

A strand composed of a plurality of fibers (hereinafter sometimes referred to as monofilaments) is wound up on a tube by a method wherein a traverse guide and the tube are spaced from each other for winding, or a method wherein the traverse guide and the tube are positioned close to each other and the winding operation is conducted while pressing down the wound strand by a touch-roll and maintaining the above distance constantly.

In the present invention, the cake is subjected to aging, and then the strand is unwound. The strand may be unwound from the cake either by an outer unwinding method or by an inner unwinding method. In the outer unwinding method, the strand is unwound from the outside of the cake. The outer unwinding method is further divided into a transverse unwinding method wherein the strand is unwound in a direction perpendicular to the rotational axis and a longitudinal unwinding method wherein the strand is unwound in a direction parallel to the rotational axis. In the inner unwinding method, the strand is unwound from the inside of the cake composed solely of the strand, which is obtained by removing the tube from the cake by a suitable method.

Figure 3B:
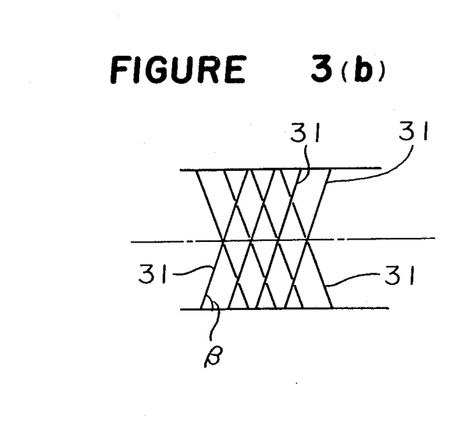

Referring to FIGS. 3(a) and (b), the cake 33 is preferably formed so that the tapering angle $\alpha$ at both ends of the winding is within a range of from 60° to 85°, and the winding angle $\beta$ of the strand 31 is within a range of at least 60° and less than 90°.

The outer unwinding method is most suitable for the above cake. However, the unwinding method is not restricted to the outer unwinding method.

The above-mentioned cake has remarkably improved unwinding properties, whereby the strand can readily be unwound without fading out. It is particularly noteworthy that the frictional damage among the gel fibers or strands during the unwinding operation can be reduced, and it is thereby possible to obtain silica glass fibers having high strength and little fuzzing. The high strength and little fuzzing contribute to an improvement in the overall yield throughout the process for the production of silica glass fibers by the sol-gel method.

Further, the present invention is effective in the reduction of breakage of monofilaments during the winding operation.

In the gel fiber cake of the present invention, unavoidable shrinkage inherent to gel fibers takes place uniformly throughout the entire gel fibers constituting the strand, whereby formation of loops decreases substantially. Accordingly, it becomes easy to control the tension applied to the strand during the sintering operation.

According to the present invention it is possible to obtain silica glass fibers having excellent quality without blackening during the sintering step.

(5) AGING STEP

The present invention provides an aging step wherein the gel fibers are subjected to aging prior to the sintering.

The aging step is characterized in that the gel fibers are stored at a temperature of from 0° to 60° C. under a relative humidity of from 10 to 90% for from one hour to 10 days. During the aging step, the gel fibers are usually maintained in the form of a cake.

The present inventors have found that gel fibers formed from a solution which is undergoing gelation are made of porous silica gel, and when such gel fibers are left at a temperature around room temperature, the strength increases and reaches a level where the fibers are durable against the tension required for the subsequent sintering.

Even after the gel fibers are formed and wound up on e.g. a tube, the fibers react with moisture in air and undergo hydrolysis and the polymerization further proceeds whereby the strength and densification gradually increase. Such effects do not substantially appear before one hour from the formation of gel fibers, and after 10 days, the density of the gel fibers tends to be too high, whereby there will be a difficulty such that the organic substance in the gel fibers can not completely be removed by the subsequent sintering step, or the alignment of a plurality of monofilaments constituting the gel fibers tends to deteriorate, such being undesirable. The period for the storage is preferably within a range of from one hour to 10 days, more preferably from 4 to 72 hours.

In the present invention, the gel fibers are stored for aging at a temperature of from 0° to 60° C. under a relative humidity of from 10 to 90%. If the temperature exceeds 60° C. or the relative humidity exceeds 90%, the hydrolysis proceeds rapidly, and there will be the same problems as mentioned above such that an organic substance will remain after the sintering, and the alignment of fibers deteriorates, and there will be a problem of deterioration in the alignment of fibers due to the softening of the treating agent applied to the gel fibers. On the other hand, if the temperature is lower than 0° C. or the relative humidity is less than 10%, no further hydrolysis and polymerization of gel fibers takes place even when the fibers are stored beyond 10 days, such being undesirable. Preferably, the temperature is within a range of from 10° to 40° C., and the relative humidity is within a range of from 30 to 70%.

The shrinkage of the gel fibers when stored in the above-mentioned ranges of the temperature of from 0° to 60° C. and the relative humidity of from 10 to 90% is from about 0.5 to about 5.0% relative to the length of the gel fibers immediately after the spinning.

According to the present invention, it is easy to control the strength and the densification of the gel fibers, and it is possible to apply a suitable tension constantly against the gel fibers during the sintering step, whereby breakage of fibers during sintering will be substantially reduced, and glass fibers having high strength can be obtained after the sintering. Namely, according to the present invention, it is possible to produce continuous silica glass fibers having high strength, which used to be extremely difficult by the conventional technique.

(6) SINTERING STEP

The present invention provides a sintering step which comprises first sintering at a temperature of not lower than 250° C. and lower than 600° C. while applying a tension of from 100 to 10,000 g/mm$^2$ to the above-mentioned gel fibers and second sintering at a temperature of from 600° to 1,100° C. while applying a tension of from 100 to 10,000 g/mm$^2$ to the fibers.

The gel fibers in this step are the ones obtained by unwinding from the cake after the aging step, and they are usualy sintered in the form of a strand.

In order to obtain silica glass fibers having high tensile strength, it is necessary to apply a tension to the gel fibers during the sintering step.

The sintering of gel fibers is accompanied by shrinkage of fibers. Therefore, in the present invention, if the tension applied to the gel fibers is less than 100 g/mm$^2$, no substantial improvement in the tensile strength will be observed. On the other hand, if the tension exceeds 10,000 g/mm$^2$, the fibers are likely to break. Within the above range, a preferred range is from 100 to 1,000 g/mm$^2$. It is desirable that such a tension is applied to the gel fibers from the initiation of the sintering to the completion since the sintering of the gel fibers is accompanied by shrinkage.

The gel fibers subjected to sintering are usually composed of a plurality of monofilaments. The gel fibers are formed by gathering a plurality of monofilaments immediately after they are spun from an alkoxide solution which is undergoing gelation. It is possible to conduct the sintering treatment continuously from the formation of the gel fibers. However, it is also possible to firstly wind up the gel fibers on a tube or bobbin and then unwind them therefrom for sintering treatment.

Some of monofilaments constituting the gel fibers may slacken or may break due to e.g. friction caused during the course from the spinning to the sintering treatment. In such a case, even if the overall force exerted to apply a tension to the gel fibers is the same, the tension applied per monofilament or the force exerted per mm$^2$ will be greater than the case where no slackening or no breakage occurs in the monofilaments. The present applicant has developed the above-mentioned oiling agent for application to the fibers immediately after the spinning in order to prevent breakage or fuzzing of the monofilaments and to facilitate unwiding of the fibers. By the treatment with such an oiling agent, it has been made possible to impart a greater force than ever as a whole to the gel fibers during the sintering treatment.

In order to obtain adequate strength, the sintering is required to be conducted within a temperature range of from 600° to 1,100° C. However, if this is done abruptly from room temperature, densification of gel fibers proceeds too much prior to the removal of the organic substance from the gel fibers, whereby the remaining organic substance will be carbonized and remains in the resulting silica glass fibers. Therefore, in the present invention, the sintering of the gel fibers is preferably conducted in two steps of first sintering and second sintering. Namely, the first sintering is intended to thermally decompose the organic substance remaining in the gel fibers to burn off carbon. The second sintering following the first sintering is intended to facilitate the sintering of the gel fibers from which carbon has been burned off, to obtain silica glass fibers having the desired strength.

In the present invention, the present inventors propose to conduct the first sintering by heating the gel fibers within a temperature range of not lower than 250° C. and lower than 600° C. The period for this first sintering varies depending upon the temperature, but is usually from 30 seconds to 5 minutes.

As a condition for heating the gel fibers for the first sintering, it is preferred to raise the temperature from room temperature to a level of from 400° to less than 600° C. at a rate of not exceeding 1,500° C./min. The rate of temperature increase is more preferably not higher than about 1,000° C./min. If the rate of temperature increase exceeds 1,500° C./min, the above-mentioned problems such as coloring due to the residual carbon or breakage of fibers or deterioration in the strength of the fibers due to inflaming (abrupt combustion) of the organic substance remaining in the gel fibers, will be likely. If the heating is conducted in an oxidizing atmosphere such as in air, the organic substance remaining in the gel fibers can readily be thermally decomposed, and the oxygen concentration is preferably high (e.g. as high as 100% oxygen).

Whereas, the second sintering is to facilitate the sintering of the gel fibers after the first sintering and to obtain silica glass fibers having the desired strength, and such second sintering is conducted at a temperature within a range of from 600° to 1,100° C. If the period for the heating is less than 10 seconds, the sintering will be inadequate, whereby no adequate strength will be obtained. On the other hand, if the period of heating exceeds 10 hours, the strength tends to deteriorate. The preferred period for heating is from 15 seconds to 10 hours. The period for heating is determined taking into consideration the heating temperature and the overall conditions for the production.

There is no particular restriction as to the rate of temperature increase from the first sintering to the second sintering. Further, the heating at a temperature of from 600° to 1,100° C. in the second sintering may not necessarily be maintained at a constant temperature so long as the heating is conducted within the temperature range. For example, the heating may be conducted for 15 minutes from 600° to 1,100° C. or may be conducted for 15 minutes at 800° C.

Figure 4:
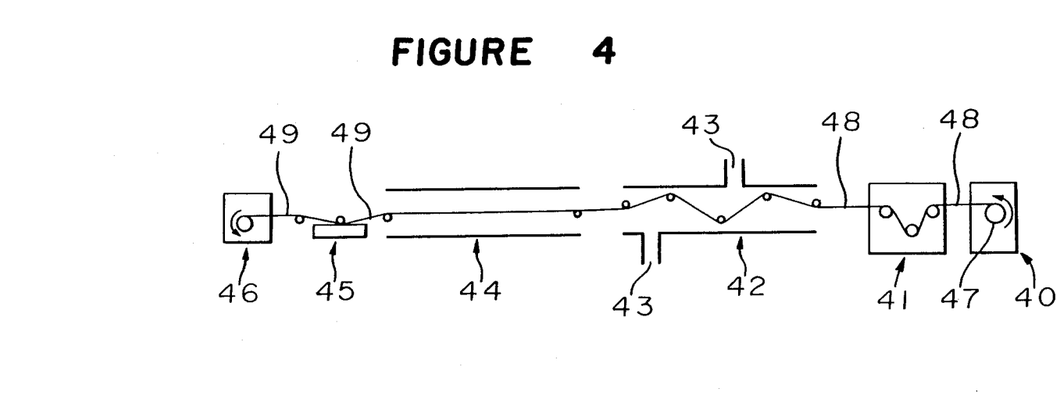
FIG. 4 illustrates the sintering step and the steps before and after the sintering step.

FIG. 4 illustrates the sintering step and the steps prior to and after the sintering step. The gel fiber strand 48 unwound from the cake 47 by an unwinding machine 40 passes through a tension controlling device 41 and enters into a first sintering furnace 42. Reference numeral 43 indicates a gas passage which makes the internal atmosphere oxidative. Then, the strand 48 is sintered in a second sintering furnace 44 into silica glass fibers 49.

It is usual that a gathering agent or a treating agent is applied by an applicator 45 to the silica glass fibers 49 obtained from the sintering step, and then the fibers are wound up on e.g. a bobbin at a winding machine 46, or finished in other form for shipping or packaging. The type of the gathering agent may suitably be selected depending upon the subsequent step or the particular use. When silica glass fibers are to be used for twisted yarns or cloth, the nest step is a twising step, and a gathering agent for twisting will be employed. When no twisting step is required, the silica fiber strand may be treated with a gathering agent or treating agent depending upon the particular use.

According to the present invention, the tensile strength will be improved to a large extent. Especially when a silicon alkoxide is used as the starting material to produce silica glass fibers, the tensile strength will be improved to an average of from 60 to 100 kg/mm$^2$ according to the present invention, while the tensile strength of the product according to the conventional process is at an average of from 40 to 60 kg/mm$^2$.

Further, according to the present invention, the variation in the value of the tensile strength will be small. If a prescribed tension is not applied to fibers during the sintering, the fibers undergo shrinkage freely and tend to have bent portions, and at such portions, the tensile strength is low. Thus, variation in the tensile strength tend to be large. Therefore, by the application of the tension, the bending of fibers is prevented, whereby the ratio of the standard deviation $\sigma$ to the average $\bar{x}$ decreases to a level of $\sigma/\bar{x}=0.1-0.2$, while the conventional ratio of $\sigma/\bar{x}=0.3-0.5$.

Furthermore, according to the present invention, the productivity will be improved by the substantial shortening of the sintering time, whereby the production costs can be reduced. Heating for a few hours used to be required to obtain silica glass fibers having no coloring and high strength by completely removing the organic substance in the gel fibers. According to the present invention, this can be completed in a few minutes, and thus high productivity is obtainable.

Now, the present invention will be described in further detail with reference to Examples. However, it should be understood that the present invention is by no means restricted to such specific Examples.

EXAMPLE 1

47.4 parts by weight of TES i.e $Si(OC_2H_5)_4$ was added to a solution comprising 45.3 parts by weight of $C_2H_5OH$, 0.3 part by weight of HCl and 7 parts by weight of $H_2O$ under stirring, and the mixture was continuously stirred at 70° C. for two days. Then, the solution having the above composition was concentrated by a rotary vacuum evaporator at 5° C. so that the residual $SiO_2$ when heated at 1,000° C. would be 42 parts by weight. This solution was left to stand and when the viscosity became 90 poise, 1.3 parts by weight of trimethylethoxysilane $(CH_3)_3SiOC_2H_5$ was added as a polymerization regulator, and spinning was conducted by a spinning apparatus having 200 nozzles, as shown in FIG. 1. The winding rate was 150 m/min, the pressure of pressurising gas was 35 kg/cm$^2$, each nozzle had a circular nozzle hole having a diameter of 0.1 mm which was formed in a protrusion provided on the base plate, and the nozzles are disposed concentrically on the effective area of the base plate.

A solution prepared by mixing a liquid paraffin having an average carbon number of 20 and a solid paraffin having an average carbon number of 24 in a weight ratio of 30:70 was applied to the gel fibers thus spun by the above spinning apparatus, in an amount of 10% by weight, and the gel fibers were wound on a paper tube.

The fibers were stored at 28° C. under a relative humidity of 60% for 15 hours. Then, they were heated from room temperature to 900° C. at a rate of temperature increase of 800° C./min in air under a tension of 800 g/mm$^2$ and then rapidly cooled, whereby no stained silica glass fibers of excellent quality were obtained. The cross sectional shape of the fibers was substantially oval with the major diameter being 16 μm, and the tensile strength at room temperature was 82 kg/mm$^2$ on an average.

EXAMPLE 2

47.4 parts by weight of TES was added to a solution comprising 45.3 parts by weight of $C_2H_5OH$, 0.3 part by weight of HCl and 7 parts by weight of $H_2O$ under stirring, and the mixture was continuously stirred at 70° C. for two days. Then, the solution having the above composition was concentrated by a rotary vacuum evaporator at 5° C. so that residual $SiO_2$ when heated to 1,000° C. would be 42 parts by weight. This solution was left to stand, and when the viscosity reached 90 poise, 4.0 parts of trimethylethoxysilane was added thereto. The solution was spun by a spinning apparatus having 200 nozzles as shown in FIG. 1.

The winding rate was 180 m/min, the pressure of pressurising gas was 35 kg/cm$^2$, each nozzle had a circular nozzle hole having a diameter of 0.1 mm, and the nozzles were disposed concentrically.

A solution prepared by mixing a liquid paraffin having an average carbon number of 20 and a solid a paraffin having an average carbon number of 24 in a ratio of 30:70 was applied to the gel fibers thus spun by the above-mentioned spinning apparatus, in an amount of 10% by weight, and the gel fibers were wound on a paper tube. The gel fibers were stored at 28° C. under a relative humidity of 60% for 24 hours. Then, they were heated from room temperature to 900° C. at a rate of temperature increase of 800° C./min in air under a tension of 800 g/mm$^2$ and then rapidly cooled to obtain no stained silica glass fibers. The cross sectional shape of the fibers was substantially oval with the major diameter being 15 μm, and the tensile strength at room temperature was 90 g/mm$^2$ on an average.

EXAMPLE 3

47.4 parts by weight of TES was added to a solution comprising 45.3 parts by weight C$_2$H$_5$OH, 0.3 part by weight of HCl and 7 parts by weight of H$_2$O under stirring, and the mixture was continuously stirred at 70° C. for two days. Then, the solution having the above composition was concentrated by a rotary vacuum evaporator at 5° C. so that residual SiO$_2$ when heated to 1,000° C. would be 42 parts by weight. This solution was left to stand, and when the viscosity reached 90 poise, 2.0 parts of trimethylethoxysilane was added thereto. The solution was spun by a spinning apparatus having 200 nozzles as shown in FIG. 1.

The winding rate was 200 m/min, the pressure of pressurising gas was 35 kg/cm$^2$, each nozzle had a circular nozzle hole having a diameter of 0.1 mm, and the nozzles were disposed concentrically.

A solution prepared by mixing a liquid paraffin having an average carbon number of 20 and a solid a paraffin having an average carbon number of 24 in a ratio of 30:70 was applied to the gel fibers thus spun by the above-mentioned spinning apparatus, in an amount of 10% by weight, and the gel fibers were wound on a paper tube. The gel fibers were stored at 28° C. under a relative humidity of 60% for 48 hours. Then, they were heated from room temperature to 900° C. at a temperature raising rate of 800° C./min in air under a tension of 350 g/mm$^2$ and then rapidly cooled to obtain no stained silica glass fibers. The cross sectional shape of the fibers was substantially oval with the major diameter being 13 μm, and the tensile strength at room temperature was 85 kg/mm$^2$ on an average.

COMPARATIVE EXAMPLE 1

47.4 parts by weight of TES was added to a solution comprising 45.3 parts by weight of C$_2$H$_5$OH, 0.3 part by weight of HCl and 7 parts by weight of H$_2$O under stirring, and the mixture was continuously stirred at 70° C. for two days. Then, the solution having the above composition was concentrated by a rotary vacuum evaporator at 5° C. so that residual SiO$_2$ when heated to 1,000° C. would be 42 parts by weight. This solution was left to stand, and when the viscosity reached 90 poise, 1.3 parts of trimethylethoxysilane was added thereto. The solution was spun by a spinning apparatus having 200 nozzles as shown in FIG. 1.

The winding rate was 150 m/min, the pressure of pressurising gas was 35 kg/cm$^2$, each nozzle had a circular nozzle hole having a diameter of 0.1 mm, and the nozzles were disposed concentrically.

A solution of a liquid paraffin having an average carbon number of 20 was applied to the gel fibers thus spun by the above-mentioned spinning apparatus, in an amount of 10% by weight, and the gel fibers were wound on a paper tube. The gel fibers were stored at 28° C. under a relative humidity of 60% for 15 hours. Then, they were heated from room temperature to 900° C. at a rate of temperature increase of 800° C./min in air under a tension of 800 g/mm$^2$ and then rapidly cooled to obtain no stained silica glass fibers. However, the silica glass fibers had substantial fuzzing, and in an extreme case, the strand broke.

COMPARATIVE EXAMPLE 2

47.4 parts by weight of TES was added to a solution comprising 45.3 parts by weight of C$_2$H$_5$OH, 0.3 part by weight of HCl and 7 parts by weight of H$_2$O under stirring, and the mixture was continuously stirred at 70° C. for two days. Then, the solution having the above composition was concentrated by a rotary vacuum evaporator at 5° C. so that residual SiO$_2$ when heated to 1,000° C. would be 40 parts by weight. This solution was left to stand, and when the viscosity reached 90 poise, 1.3 parts by weight of trimethylethoxysilane was added thereto. The solution was spun by a spinning apparatus having 200 nozzles as shown in FIG. 1.

The winding rate was 150 m/min, the pressure of pressurising gas was 35 kg/cm$^2$, each nozzle had a circular nozzle hole having a diameter of 0.1 mm, and the nozzles were disposed concentrically.

The gel fibers thus spun by the above spinning apparatus easily broke, and it was impossible to wind them on a paper tube.

COMPARATIVE EXAMPLE 3

47.4 parts by weight of TES was added to a solution comprising 45.3 parts by weight of C$_2$H$_5$OH, 0.3 part by weight of HCl and 7 parts by weight of H$_2$O under stirring, and the mixture was continuously stirred at 70° C. for two days. Then, the solution having the above composition was concentrated by a rotary vacuum evaporator at 5° C. so that residual SiO$_2$ when heated to 1,000° C. would be 42 parts by weight. This solution was left to stand, and when the viscosity reached 90 poise, 1.3 parts by weight of trimethylethoxysilane was added thereto. The solution was spun by a spinning apparatus having 200 nozzles as shown in FIG. 1.

The winding rate was 150 m/min, the pressure of pressurising gas was 35 kg/cm$^2$, each nozzle had a circular nozzle hole having a diameter of 0.1 mm, and the nozzles were disposed concentrically.

A solution prepared by mixing a liquid paraffin having an average carbon number of 20 and solid a paraffin having an average carbon number of 24 in a ratio of 30:70 was applied to the gel fibers thus spun by the above-mentioned spinning apparatus, in an amount of 10% by weight, and the gel fibers were wound on a paper tube.

After spinning, the gel fibers were immediately heated from room temperature to 900° C. at a rate of temperature increase of 800° C./min in air under a tension of 800 g/mm$^2$ and then rapidly cooled, whereby breakage of the fibers frequented during the sintering.

EXAMPLE 4

47.4 parts by weight of TES was added to a solution comprising 45.3 parts by weight of $C_2H_5OH$, 0.3 part by weight of HCl and 7 parts by weight of $H_2O$ under stirring, and the mixture was continuously stirred at 70° C. for two days. Then, the solution having the above composition was concentrated by a rotary vacuum evaporator at 5° C. so that residual $SiO_2$ when heated to 1,000° C. would be 42 parts by weight. This solution was left to stand, and when the viscosity reached 90 poise, $Y_3SiX$ as identified in Table 1 was added thereto to obtain a silica fiber spinning solution. The spinning solution was spun by a spinning apparatus having 200 nozzles as shown in FIG. 1, and the results are shown in Table 1. The winding rate was 150 m/min, the pressure of pressurising gas was 35 kg/cm$^2$, and a diameter of each nozzle hole was 0.1 mm. Further, the results in a case where no polymerization regulator was added, are also shown in Table 1.

for hydrolysis and condensation polymerization. Hydrochloric acid was used as a catalyst. This solution was concentrated so that a $SiO_2$ content would be 46% by weight, whereupon the water content was measured by a Karl Fisher's moisture meter and found to be 0.8% by weight. To this solution, 3% by weight of trimethylmethoxysilane was added, and when the viscosity reached 60 poise, the solution was charged into a tank and extruded into the atmosphere from a spinneret having about 100 nozzles (nozzle hole diameter: about 100 μm) under pressure. The spun fibers thereby formed were wound on a winding drum provided below at a rate of 100 m/min, whereby gel fibers were continuously formed without breakage for a long period of time. The cross sectional shape of the gel fibers thus obtained was oval with its major diameter being about 20 μm. The gel fibers were heated from room temperature to 900° C. at a rate of temperature increase of 50° C./min for sintering, to obtain no stained silica glass fibers having a major diameter of about 16 μm and a tensile strength of 80 kg/mm$^2$.

TABLE 1

| Test No. | $Y_3SiX$ | Amount (mol ratio) | Stability (hr; 70° C.) | Diameter of fibers (μm; 95% reliability) | Spinnability | Blackening | Tensile strength (kg/mm$^2$) |
|---|---|---|---|---|---|---|---|
| Comparative test | Not added | — | <1 | 23.0 ± 2.1 | X | Δ | 60 |
| 1 | $(CH_3)_3SiOCH_3$ | 0.005 | 2 | 19.1 ± 1.3 | Δ | ○ | 65 |
| 2 | $(CH_3)_3SiOCH_3$ | 0.130 | 10 | 8.3 ± 0.2 | ⊙ | ⊙ | 90 |
| 3 | $(CH_3)_3SiOCH_3$ | 0.300 | 100 | 8.2 ± 0.2 | ⊙ | ⊙ | 90 |
| 4 | $(CH_3)_3SiOCH_3$ | 0.500 | 200 | 10.1 ± 0.3 | ⊙ | ⊙ | 85 |
| 5 | $(CH_3)_3SiOCH_3$ | 0.900 | 500 | 14.8 ± 0.4 | ○ | ○ | 80 |
| 6 | $(CH_3)_3SiOCH_3$ | 2.00 | 700 | 17.5 ± 0.4 | ○ | ○ | 70 |
| 7 | $(CH_3)_3SiOCH_3$ | 2.60 | >1000 | 21.3 ± 1.4 | Δ | Δ | 60 |
| 8 | $(CH_3)_3SiOC_2H_5$ | 0.150 | 12 | 8.6 ± 0.3 | ⊙ | ⊙ | 90 |
| 9 | $(CH_3)_3SiOC_2H_5$ | 0.300 | 100 | 8.4 ± 0.3 | ⊙ | ⊙ | 88 |
| 10 | $(C_6H_5)_3SiOCH_3$ | 0.150 | 12 | 8.3 ± 0.2 | ⊙ | ⊙ | 87 |
| 11 | $(CH_3)_3SiCl$ | " | 6 | 9.2 ± 0.4 | ⊙ | ⊙ | 86 |
| 12 | $(C_6H_5)_3SiCl$ | " | 6 | 9.5 ± 0.4 | ⊙ | ⊙ | 87 |
| 13 | $(C_6H_5)_2CH_3SiOCH_3$ | 0.300 | 50 | 10.3 ± 0.3 | ⊙ | ⊙ | 82 |
| 14 | $(CH_3)_2C_2H_2SiOCH_3$ | 0.150 | 10 | 10.4 ± 0.3 | ⊙ | ⊙ | 82 |
| 15 | $(C_2H_5)(C_3H_7)(C_6H_5)SiCl$ | 0.150 | 12 | 12.6 ± 0.4 | ⊙ | ○ | 80 |
| 16 | $(C_5H_{11})_3SiOH$ | " | 10 | 18.7 ± 0.5 | ⊙ | ○ | 80 |
| 17 | $(CH_3)_2C_2H_3SiOCH_3$ | 0.300 | 70 | 10.2 ± 0.3 | ⊙ | ⊙ | 86 |
| 18 | $(CH_3)_2C_2H_3SiCl$ | 0.150 | 6 | 10.1 ± 0.2 | ⊙ | ⊙ | 80 |
| 19 | $(CH_3)_3SiOCH_3$ $(C_6H_5)_2CH_3SiOCH_3$ | 0.05 0.07 | 10 | 7.7 ± 0.6 | ⊙ | ⊙ | 87 |
| 20 | $(CH_3)_3SiOC_2H_5$ $(C_6H_5)_3SiOCH_3$ | 0.07 0.07 | 10 | 9.5 ± 0.2 | ⊙ | ⊙ | 88 |

In Table 1, the stability of the spinning solution was represented by the time (hours) until gelation at a temperature of 70° C., and the greater the numerical value, the higher the stability.

The spinnability was determined on the basis of the stability for the spinning operation such as the uniformity in the fiber diameter, the drying efficiency and breakage of fibers. Symbol ⊙ represents excellent, symbol ○ represents good, symbol Δ represents slightly inferior, symbol X represents inferior.

The gel fibers after spinning were sintered at 250° C. for one hour and at 600° C. for two hours, whereupon the strength of the monofilaments were measured by an Instron tensile tester at a gauge length of 25 mm and a tensile rate of 0.5 mm/min.

The blackening was evaluated by visual observation. symbol ⊙ represents pure white, symbol ○ represents white, symbol Δ represents slightly brown.

EXAMPLE 5

640 g of ethyl silicate 40 was dissolved in 250 g of ethanol, and 110 g of water was added to the solution. Then, the solution was maintained at room temperature

COMPARATIVE EXAMPLE 4

In Example 5, spinning was conducted in the same manner as above, when the viscosity of the spinning solution was 40 poise, whereby no adequate gelation proceeded after the spinning solution was extruded from the nozzle holes, and breakage of filaments occured and it was impossible to wind gel fibers continuously.

COMPARATIVE EXAMPLE 5

In Example 5, spinning was conducted in the same manner as above, when the viscosity of the spinning solution was 120 poise, whereby the solution was extruded from the nozzle holes, but it was impossible to stretch the fibers to a level of about 1/5 (about 20 μm) of the diameter of the nozzle hole or about 1/25 in the cross sectional area.

EXAMPLE 6

In Example 2, when the viscosity of the spinning solution became 95 poise, 3 wt% methanol was added thereto, whereby the viscosity became 65 poise. This spinning solution was spun in the same manner as in Example 5, whereby it was possible to obtain gel fibers continuously without breakage for a long period of time by stretching the fibers to a level of about 1/5 of the diameter of the nozzle hole or about 1/25 in the cross sectional area. After sintering, silica glass fibers having a major diameter of about 12 μm and a tensile strength of 100 kg/mm² were obtained.

EXAMPLE 7

200 g of TES was dissolved in 200 g of ethanol, and 40 g of water was added thereto. Then, the solution was maintained at 75° C. for 50 hours for hydrolysis and condensation polymerization. Nitric acid was used as a catalyst. This solution was concentrated so that the $SiO_2$ content would be 44% by weight, and the water content was measured by a Karl Fisher's moisture meter and found to be 0.9% by weight. Then, 5% by weight of trimethylethoxysilane was added thereto, and when the viscosity reached 60 poise, spinning was conducted in the same manner as in Example 5, whereby it was possible to obtain gel fibers continuously without breakage over a long period of time. The major diameter of the gel fibers was about 20 μm, and the silica glass fibers after sintering had a major diameter of about 16 μm and a tensile strength of 80 kg/mm².

EXAMPLE 8

200 g of TMS i.e. $Si(OCH_3)_4$ was dissolved in 150 g of methanol, and 53 g of water was added thereto. Then, the solution was maintained at 75° C. for 24 hours for hydrolysis and condensation polymerization. Nitric acid was used as the catalyst. This solution was concentrated so that the $SiO_2$ content would be 44% by weight, and the water content was measured by a Karl Fisher's moisture meter and found to be 0.8% by weight. When the viscosity reached 80 poise, 5% by weight of trimethylethoxysilane was added thereto, and spinning was conducted in the same manner as in Example 5, whereby it was possible to obtain gel fibers continuously without breakage over a long period of time. The major diameter of the gel fibers was about 20 μm, and the silica glass fibers after sintering had a major diameter of about 16 μm and a tensile strength of 70 kg/mm².

EXAMPLE 9

In Example 1, an oiling agent prepared by mixing a liquid paraffin having an average carbon number of 20 (A-I), a liquid paraffin having an average carbon number of 30 (A-II), a solid paraffin having an average carbon number of 22 (B-I) and a solid paraffin having an average carbon number of 24 (B-II) in the proportions as identified in Table 2, was applied to the gel fibers immediately after the spinning. The gathering efficiency, the presence or absence of fuzzing, the unwinding efficiency and the adhesion of monofilaments before and after sintering were evaluated and shown in Table 2.

TABLE 2

| | | Average carbon number | Proportions (wt %) (Winding method) | | | | | Proportions (wt %) (piling method) | |
|---|---|---|---|---|---|---|---|---|---|
| Liquid | A-I | 20 | 100 | — | — | 50 | 40 | 30 | 100 | — |
| paraffin | A-II | 30 | — | 100 | — | — | — | — | — | 100 |
| Solid | B-I | 20 | — | — | 100 | — | — | — | — | — |
| paraffin | B-II | 24 | — | — | — | 50 | 60 | 70 | — | — |
| Gathering efficiency | | | X | X | ○ | ○ | ◉ | ◉ | ○ | ○ |
| Fuzzing | | | X | X | ○ | ○ | ◉ | ◉ | ○ | ○ |
| Unwinding efficiency | | | X | X | ○ | ○ | ◉ | ◉ | ○ | ○ |
| Adhesion of monofilaments | | | No | No | No | No | No | No | No | No |

◉: excellent
○: good
X: inferior

COMPARATIVE EXAMPLE 6

After the preparation of gel fibers in Example 1, the gel fibers were stored at 28° C. under a relative humidity of 60% for 30 minutes. Then, it was attempted to sinter them by heating them from room temperature to 900° C. at a rate of temperature increase of 800° C./min in air under a tension of 900 g/mm². However, the fibers broke in the course of the temperature increase.

COMPARATIVE EXAMPLE 7

After the preparation of gel fibers in Example 1, the fibers were stored at 18° C. under a relative humidity of 35% for 11 days. Then, they were sintered in the same manner as in Comparative Example 6, and silica glass fibers thereby obtained had poor alignment of fibers, and a part of the fibers had brown color.

EXAMPLE 10

A silicon alkoxide solution comprising 48.2% by weight of TES as a silicon alkoxide, 0.7% by weight of concentrated hydrochloric acid, 5.8% by weight of water and 47.5% by weight of ethyl alcohol, was subjected to a synthesis by a distillation method at 82° C. for 30 hours, and then 3% by weight of trimethylethoxysilane was added thereto to obtain a spinning solution. The solution was spun by a spinning apparatus to obtain gel fibers. The gel fibers were heated from room temperature to 450° C. at a rate of temperature increase of 500° C./min in air under a tension of 150 g/mm² and then continuously heated to 900° C. at a rate of temperature increase of 1,000° C./min, and then rapidly cooled to obtain no stained silica glass fibers. The tensile strength at room temperature of these fibers was 61 kg/mm² on an average ($\sigma/\bar{x}=0.13$).

COMPARATIVE EXAMPLE 8

In the same manner as in Example 10, gel fibers were prepared, and they were sintered in the same atmosphere and temperature conditions as in Example 10 without applying any tension. The tensile strength of the silica glass fibers thus obtained was 25 kg/mm² ($\sigma/\bar{x}=0.29$).

EXAMPLE 11

In the same manner as in Example 10, gel fibers were prepared, and they were heated from room temperature to 550° C. at a temperature raising rate of 1,000° C./min in oxygen under a tension of 350 g/mm² and then heated continuously to 850° C. at a rate of temperature increase of 1,100° C./min, and then rapidly cooled to obtain no stained silica glass fibers. The tensile strength at room temperature of these fibers was 83 kg/mm² on an average ($\sigma/\bar{x}=0.14$). Further, the above gel fibers were sintered under the above-mentioned temperature condition in air under a tension of 350 g/mm². A part of the silica glass fibers thus obtained had brown color, but the tensile strength was 60 kg/mm² on an average ($\sigma/\bar{x}=0.15$).

EXAMPLE 12

In the same manner as in Example 10, gel fibers were prepared, and they were heated from room temperature to 590° C. at a temperature raising rate of 600° C./min in oxygen under a tension of 980 g/mm² and then continuously heated to 1,050° C. at a temperature raising rate of 1,500° C./min, and then rapidly cooled to obtain no stained silica glass fibers. The tensile strength at room temperature of these fibers was 70 kg/mm² on an average ($\sigma/\bar{x}=0.12$).

EXAMPLE 13

A silicon alkoxide solution comprising 58.2% by weight of TES, 0.2% by weight of concentrated nitric acid, 11.8% by weight of water and 30.0% by weight of ethyl alcohol, was subjected to synthesis by a distillation method at 82° C. for 20 hours, and 5% by weight of trimethylethoxysilane was added thereto to obtain a spinning solution. The spinning solution was spun by a spinning apparatus to obtain gel fibers. The fibers were heated from room temperature to 420° C. at a rate of temperature increase of 700° C./min in oxygen under a tension of 120 g/mm² and then continuously heated at 800° C. for 3 minutes, and then rapidly cooled to obtain no stained silica glass fibers. The tensile strength at room temperature of these fibers was 79 kg/mm² on an average ($\sigma/\bar{x}=0.11$).

COMPARATIVE EXAMPLE 9

Gel fibers prepared in the same manner as in Example 13 were sintered under the same atmosphere and temperature conditions as in Example 4 without applying any tension. The tensile strength at room temperature of the silica fibers thus obtained was 28 kg/mm² on an average ($\sigma/\bar{x}=0.25$).

COMPARATIVE EXAMPLE 10

Gel fibers prepared in the same manner as in Example 13 was heated from room temperature to 420° C. at a rate of temperature increase of 2,000° C./min in oxygen under a tension of 120 g/mm² and then heated at 800° C. for 3 minutes, and then rapidly cooled to obtain silica glass fibers having brown color. The tensile strength at room temperature of these fibers was 42 kg/mm² on an average ($\sigma/\bar{x}=0.34$).

COMPARATIVE EXAMPLE 11

Gel fibers prepared in the same manner as in Example 13 was heated from room temperature to 420° C. at a rate of temperature increase of 700° C./min in oxygen under a tension of 120 g/mm² and then heated at 800° C. for 3 minutes without any tension, and then rapidly cooled to obtain no stained silica glass fibers. The fibers were slightly bent, and the tensile strength at room temperature was 44 kg/mm² on an average ($\sigma/\bar{x}=0.26$).

COMPARATIVE EXAMPLE 12

Gel fibers prepared in the same manner as in Example 13 was heated from room temperature to 420° C. at a rate of temperature increase of 700° C./min in oxygen under a tension of 120 g/mm² and then heated at 800° C. for 12 hours, and then rapidly cooled to obtain no stained silica glass fibers. The tensile strength at room temperature of these fibers was 48 kg/mm² on an average ($\sigma/\bar{x}=0.25$).

COMPARATIVE EXAMPLE 13

Gel fibers prepared in the same manner as in Example 13 was heated from room temperature to 420° C. under a rate of temperature increase of 700° C./min in oxygen under a tension of 120 g/mm² and then continuously heated at 800° C. for 8 seconds, and then rapidly cooled to obtain no stained silica glass fibers. The tensile strength at room temperature of these fibers was 39 kg/mm² on a average ($\sigma/\bar{x}=0.37$).

EXAMPLE 14

A silicon alkoxide solution comprising 100 parts by weight of TES, 15 parts by weight of 0.5N hydrochloric acid and 100 parts by weight of ethanol was reacted at 75° C. for 60 hours. The solution was concentrated so that the $SiO_2$ content would be 44% by weight. To the cencentrated solution, 2% by weight of trimethylethoxysilane was added, and when the viscosity reached 70 poise, the solution was introduced into a tank 1 as shown in FIG. 1. The spinning was conducted by means of a spinning apparatus as shown in FIG. 1.

The nozzles had a shape as shown in FIG. 2, and the nozzle holes had a diameter of 0.12 mm, whereby 200 nozzles were disposed on a circular base plate having the circumferential diameter of 120 mm, and the density of the nozzle holes was 1.6 holes/cm².

The spinning was conducted by such a nozzle apparatus, whereby it was possible to spin continuously for more than 10 hours without any extrusion trouble, and no trouble due to deposition of the spinning solution was observed. The winding up rate was 120 m/min, and the diameter of the gel fibers thus obtained was 10 μm, and the stretching ratio was 12.

COMPARATIVE EXAMPLE 14

A nozzle apparatus wherein nozzles having a nozzle hole diameter of 0.23 mm and having the shape as shown in FIG. 2 were disposed in the same manner as in Example 14, was assembled into a spinning apparatus as shown in FIG. 1, and the spinning was conducted. In this case, the diameter of the finest gel fibers was 17 μm, and when the winding rate was raised to 130 m/min to obtain finner fibers, breakage of fibers occured, and it was impossible to wind them up continuously. Thus, the maximum stretching ratio was 13.5, and it was impossible to obtain gel fibers having a diameter of about 10 μm as obtained in Example 14. This is because the diameter of the nozzle holes was too large as compared with the desired diameter of fibers.

COMPARATIVE EXAMPLE 15

The spinning was conducted under the same condition as in Example 14 by using a spinning apparatus as shown in FIG. 1 in which a nozzle apparatus wherein nozzles having a nozzle hole diameter of 0.025 mm having the shape as shown in FIG. 2 were disposed in the same manner as in Example 14, was assembled. Immediately after the initiation of the spinning, about 20% of the nozzles had a trouble in extrusion, and as time passed, the proportion of the nozzles having the extrusion trouble increased, whereby it was practically impossible to obtain the continuous strands. The cause for the extrusion trouble was that the diameter of the nozzle holes was too small, whereby the nozzle holes were clogged with dust or foreign matters, and the continuous flow of the spinning solution was impaired.

We claim:

1. A process for producing silica glass fibers, comprising:
   (i) preparing a silica glass fiber spinning solution having a residual $SiO_2$ content of from 42-48% by weight when heated at 1,000° C., a water content of not greater than 2% by weight and a viscosity of from 50-100 poise at 25° C. by adding a polymerization regulator to a silica sol solution obtained by the hydrolysis and condensation of a silicon alkoxide in the presence of an acid catalyst;
   (ii) spinning the spinning solution into gel fibers by extrusion of the solution through a plurality of nozzle holes;
   (iii) applying an oiling agent substantially free of water or a lower alcohol to the gel fibers;
   (iv) winding the oiled gel fibers onto a tube or bobbin thereby forming a fiber cake;
   (v) aging the wound gel fibers at a temperature of 0°-60° C. in an atmosphere of a relative humidity of 10-90% for a time of about 1 hour to 10 days; and
   (vi) sintering the gel fibers, unwound from the fiber cake after the aging step, in two steps, wherein, in the first step, the fibers are sintered at a temperature from 250° C. to less than 600° C. at a rate of temperature increase not exceeding 1,500° C./min while applying a tension to the fibers of from 100-10,000 $g/mm^2$ and, in the second step, the fibers are sintered at a temperature from 600° C.-1,100° C. while applying a tension to the fibers of from 1001-0,000 $g/mm^2$.

2. The process according to claim 1, wherein the polymerization regulator is a silicon compound represented by the formula $Y_1(Y_2)(Y_3)SiX$ wherein each of $Y_1$, $Y_2$ and $Y_3$ is an allyl group, an aryl group, a phenyl group, a vinyl group or an alkyl group and X is H, Cl, Br, I, OH or OR wherein R is an alkyl group having from 1 to 10 carbon atoms.

3. The process according to claim 2, wherein the molar ratio of Si contained in the polymerization regulator to Si contained in the silica sol solution is from 0.01 to 2.5.

4. The process according to claim 1, wherein the diameter of holes in said nozzle through which said solution is extruded ranges from 0.03 mm to 0.14 mm.

5. The process according to claim 1, wherein the nozzle holes are formed perpendicularly to end surfaces of protrusions formed on a base plate, said end surfaces being in parallel with said base plate, and which extend through the base plate, and the diameter of the nozzle holes is within a range of not larger than 14 times the diameter of the gel fibers or at least 0.03 mm.

6. The process according to claim 1, wherein the oiling agent is a water insoluble substance.

7. The process according to claim 6, wherein the water insoluble substance is a solid paraffin having an average carbon number of from 20 to 50, or a mixture of such a solid paraffin and a liquid paraffin having an average carbon number of at least 18.

8. The process according to claim 4, wherein said diameter size ranges from 0.05 mm to 0.12 mm.

9. The process according to claim 1, wherein the concentration of acid catalyst in said spinning solution of step (i) ranges from 0.1-3.5% by weight relative to said silicon alkoxide.

10. The process according to claim 1, wherein, in said aging step (v), the fibers are aged at a temperature of from 10°-40° C. at a relative humidity of 30-70%.

* * * * *